United States Patent
Kowalyshyn

(10) Patent No.: US 9,654,503 B1
(45) Date of Patent: May 16, 2017

(54) SYSTEMS AND METHODS FOR EVALUATING NETWORKS

(71) Applicant: Symantec Corporation, Mountain View, CA (US)

(72) Inventor: Daniel Kowalyshyn, Cypress, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/644,691

(22) Filed: Mar. 11, 2015

(51) Int. Cl.
 *H04L 29/06* (2006.01)

(52) U.S. Cl.
 CPC ...... *H04L 63/1466* (2013.01); *H04L 63/1425* (2013.01); *H04L 63/1408* (2013.01)

(58) Field of Classification Search
 CPC . H04L 63/1466; H04L 63/14; H04L 63/1408; H04L 63/1425; H04L 63/1441
 See application file for complete search history.

(56) References Cited

U.S. PATENT DOCUMENTS

| | | | |
|---|---|---|---|
| 8,359,470 B1* | 1/2013 | Choi | H04L 63/126 380/270 |
| 8,561,181 B1* | 10/2013 | Hernacki | G06F 21/552 726/1 |
| 2007/0118344 A1* | 5/2007 | Bolt | G05B 23/0254 703/2 |
| 2007/0153763 A1* | 7/2007 | Rampolla | H04L 41/0806 370/351 |
| 2009/0025082 A1* | 1/2009 | Ji | H04L 63/1466 726/23 |
| 2010/0153537 A1* | 6/2010 | Wang | H04L 63/14 709/224 |
| 2010/0262688 A1* | 10/2010 | Hussain | H04L 63/1433 709/224 |
| 2010/0287302 A1* | 11/2010 | Siemens | H04L 41/147 709/233 |

(Continued)

OTHER PUBLICATIONS

Caida, HIJACKS: Detecting and Characterizing Internet Traffic Interception based on BGP Hijacking, Sep. 2014, https://www.caida.org/funding/hijacks/hijacks_proposal.xml#ZJPW2007.*

(Continued)

*Primary Examiner* — Saleh Najjar
*Assistant Examiner* — Khang Do
(74) *Attorney, Agent, or Firm* — FisherBroyles LLP

(57) ABSTRACT

A computer-implemented method for evaluating networks may include (1) identifying an initial set of recorded packet performance data that describes an instance of an attempt to establish a network connection path between an original node and a subsequent node in a network, (2) detecting, by a software security system, a network anomaly based on comparison data resulting from a comparison between the initial set of recorded packet performance data and an additional set of recorded packet performance data that describes another instance of an attempt to establish a network connection path between the original node and the subsequent node, and (3) performing, by the software security system, and in response to detecting the network anomaly based on the comparison between the sets of packet performance data, a security action to protect the computing device. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2011/0185421 A1* | 7/2011 | Wittenstein | ............ | G06F 21/554 726/22 |
| 2011/0202416 A1* | 8/2011 | Buer | .................. | G06Q 20/1085 705/18 |
| 2013/0036466 A1* | 2/2013 | Penta | .................... | H04L 63/102 726/22 |
| 2016/0027399 A1* | 1/2016 | Wilde | .................... | G06F 13/382 345/520 |

OTHER PUBLICATIONS

Microsoft, How to Use TRACERT to Troubleshoot TCP/IP Problems in Windows, Aug. 6, 2002, https://support.microsoft.com/enus/kb/314868.*

"Norwegian security probes eavesdropping, tracking devices hidden near government buildings", http://www.usnews.com/news/world/articles/2014/12/14/norway-probes-spy-equipment-found-in-central-oslo, as accessed Jan. 29, 2015, Associated Press, U.S. News & World Report, (Dec. 14, 2014).

"Man-in-the-middle attack", http://en.wikipedia.org/wiki/Man-in-the-middle_attack, as accessed Jan. 29, 2015, Wikipedia, (Jun. 5, 2004).

"OSI model", http://en.wikipedia.org/wiki/OSI_model, as accessed Jan. 29, 2015, Wikipedia, (Jan. 13, 2004).

"Transport Layer Security", http://en.wikipedia.org/wiki/Transport_Layer_Security, as accessed Jan. 29, 2015, Wikipedia, (Jan. 7, 2004).

Ramachandran, Vivek "WLAN Security Megaprimer Part 12: Man-In-The-Middle Attack", https://www.youtube.com/watch?v=39N8G-O7XSQ, as accessed Jan. 29, 2015, (Sep. 24, 2012).

Ramachandran, Vivek "WLAN Security Megaprimer Part 13 : SSL Man-In-The-Middle Attacks", https://www.youtube.com/watch?v=Smdzyc3Aqx0, as accessed Jan. 29, 2015, (Sep. 24, 2012).

Estefan, Javier "Man in the Middle Attack using SSL Stripping", https://www.youtube.com/watch?v=rl0HXfbffKw, as accessed Jan. 29, 2015, (Apr. 29, 2013).

"Cracking SSH with BackTrack 3", https://www.youtube.com/watch?v=VIJCWH0UeEA&index=42&list=PLD57FE11 C7A09034F, as accessed Jan. 29, 2015, (Jul. 15, 2009).

"OSI model", http://en.wikipedia.org/wiki/OSI_model#Description_of_OSI_layers, as accessed Jan. 29, 2015, Wikipedia, (Jan. 13, 2004).

"Routing", http://en.wikipedia.org/wiki/Routing, as accessed Jan. 29, 2015, Wikipedia, (Jan. 4, 2004).

"Network traffic control", http://en.wikipedia.org/wiki/Network_traffic_control, as accessed Jan. 29, 2015, Wikipedia, (Sep. 13, 2006).

"Address space", http://en.wikipedia.org/wiki/Address_space, as accessed Jan. 29, 2015, Wikipedia, (Jul. 24, 2004).

"Traceroute", https://en.wikipedia.org/wiki/Traceroute, as accessed Jan. 29, 2015, Wikipedia, (Feb. 24, 2004).

Goodin, Dan "Lenovo PCs ship with man-in-the-middle adware that breaks HTTPS connections [Updated]", http://arstechnica.com/security/2015/02/lenovo-pcs-ship-with-man-in-the-middle-adware-that-breaks-https-connections/, as accessed Feb. 19, 2015, Ars Technica, (Feb. 19, 2015).

"Apache Mahout", http://en.wikipedia.org/wiki/Apache_Mahout, as accessed Jan. 29, 2015, Wikipedia, (Apr. 27, 2009).

"Graph (abstract data type)", http://en.wikipedia.org/wiki/Graph_%28abstract_data_type%29, as accessed Jan. 29, 2015, Wikipedia, (Jan. 20, 2012).

"Graph database", http://en.wikipedia.org/wiki/Graph database, as accessed Jan. 29, 2015, Wikipedia, (Nov. 2, 2009).

"Understanding the OSI Reference Model: Cisco Router Training 101", https://www.youtube.com/watch?v=sVDwG2RdJho, as accessed Jan. 29, 2015, (Sep. 15, 2012).

\* cited by examiner

US 9,654,503 B1

SYSTEMS AND METHODS FOR EVALUATING NETWORKS

BACKGROUND

Individuals and organizations often seek to protect their computer networks and devices from unauthorized intrusions and attacks. For example, an intruder may monitor a computer network without authorization by intercepting network packets. In a more specific example, intruders may not only listen to network traffic, but may also modify and forward network packets. Network administrators and others may call these types of intruders "man in the middle" attackers. A "man in the middle" attacker may infiltrate a network by inserting an additional network node between a source and destination, as discussed further below. The additional network node may intercept a network packet, modify the packet, and forward the modified packet.

"Man in the middle" attacks can be difficult to identify. Manual inspection to identify these attacks may be inefficient, cumbersome, and prone to human error. Moreover, automated security programs may fail to perform sufficient checks to identify "man in the middle" and related attacks. Even if these traditional systems use some methods for identifying the attacks, such traditional systems may not use other methods. Moreover, the traditional systems may not check for attacks according to a desired frequency or schedule. Similarly, these traditional systems may be performed in isolation, thereby preventing others from benefiting from the results of the checks. Accordingly, the instant disclosure identifies and addresses a need for additional and improved systems and methods for evaluating networks.

SUMMARY

As will be described in greater detail below, the instant disclosure generally relates to systems and methods for evaluating networks by, for example, comparing two sets of packet performance data to detect a network anomaly that is indicative of a potential security threat. In one example, a computer-implemented method for evaluating networks may include (1) identifying an initial set of recorded packet performance data that describes an instance of an attempt to establish a network connection path between an original node and a subsequent node in a network, (2) detecting, by a software security system, a network anomaly based on comparison data resulting from a comparison between the initial set of recorded packet performance data and an additional set of recorded packet performance data that describes another instance of an attempt to establish a network connection path between the original node and the subsequent node, and (3) performing, by the software security system, and in response to detecting the network anomaly based on the comparison between the sets of packet performance data, a security action to protect the computing device from a potential security threat indicated by the network anomaly.

In some examples, the computer-implemented method may further include providing the initial set of recorded packet performance data that describes the instance of the attempt to establish the network connection path to a security database of a backend server provided by a security vendor. The backend server may collect packet performance data from a multitude of client devices and may store the packet performance data within the security database to identify reputations of network devices. In further examples, the computer-implemented method may include providing an identifier for the initial set of recorded packet performance data to the backend server to enable the security database to store the initial set of recorded packet performance data indexed by the identifier. In one embodiment, the identifier for the initial set of recorded packet performance data may be provided to the backend server separate from the packet performance data.

In one embodiment, one or both of the following generates the comparison data by comparing the initial set of recorded packet performance data and the additional set of recorded packet performance data: (1) the computing device and/or (2) a backend server provided by a security vendor that collects packet performance data from a multitude of client devices and stores the packet performance data within a security database to identify reputations of network devices.

In another embodiment, the attempt to establish the network connection path may correspond to an attempt to connect to a backend server provided by a security vendor that collects packet performance data from a multitude of client devices and stores the packet performance data within a security database to identify reputations of network devices. Additionally, or alternatively, the attempt to establish the network connection path may correspond to an attempt to connect to the computing device by a backend server provided by a security vendor that collects packet performance data from a multitude of client devices and stores the packet performance data within a security database to identify reputations of network devices.

In one embodiment, the subsequent node may include either: (1) a destination web server requested by an application at the computing device or (2) an intermediary node on the network connection path between the original node and the destination web server.

In further embodiments, the anomaly may include a change in (1) a security layer certificate, (2) an identity of a network node in the network connection path, (3) a number of hops in the network connection path, (4) a connection speed in attempting to establish the network connection path, (5) a direction of the network connection path, and/or (6) header metadata within layers 3-5 of a network packet according to the open systems interconnection model.

In some examples, detecting the network anomaly based on the comparison data may include receiving historical data from a security database of a backend server provided by a security vendor that collects packet performance data from a multitude of client devices and stores the packet performance data within the security database to identify reputations of network devices. In one embodiment, the historical data may include the additional set of recorded packet performance data that describes the other instance of the attempt to establish the network connection path and/or the comparison data resulting from the comparison between the initial set of recorded packet performance data and the additional set of recorded packet performance data.

In one embodiment, the initial set of recorded packet performance data may include output from a network analysis command. The output may include a sequence of network address identities and a packet travel time for each network address identity in the sequence of network address identities. In another embodiment, the network analysis command may include a traceroute command.

In one embodiment, the comparison between the initial set of recorded packet performance data and the additional set of recorded packet performance data may include a comparison between initial output from an initial execution of the network analysis command and subsequent output from a subsequent execution of the same or different network analysis command. In some examples, detecting the network anomaly may include: (1) calculating a statistical measure of differences between the initial set of recorded packet performance data and the additional set of recorded packet performance data and (2) comparing the statistical measure of differences to a security threshold to determine that the statistical measure of differences exceeds the security threshold. In one embodiment, the security threshold is based, at least in part, on a baseline statistical measure of differences between instances of attempting to establish the network connection path.

In some examples, the computer-implemented method may further include reporting the comparison data to a backend server provided by a security vendor that collects comparison data from a multitude of client devices to enable the backend server to identify, within a security database, the potential security threat as associated with a source node within the network connection path.

In one embodiment, the same computing device records both: (1) the initial set of recorded packet performance data that describes an instance of an attempt, by the computing device, to establish a network connection path between the original node and the subsequent node in the network and (2) the additional set of recorded packet performance data that describes the other instance of an attempt, by the computing device, to establish a network connection path between the original node and the subsequent node in the network.

In one embodiment, a system for implementing the above-described method may include (1) an identification module, stored in memory, that identifies an initial set of recorded packet performance data that describes an instance of an attempt to establish a network connection path between an original node and a subsequent node in a network, (2) a detection module, stored in memory, that detects a network anomaly based on comparison data resulting from a comparison between the initial set of recorded packet performance data and an additional set of recorded packet performance data that describes another instance of an attempt to establish a network connection path between the original node and the subsequent node, (3) a performance module, stored in memory, that performs, in response to detecting the network anomaly based on the comparison between the sets of packet performance data, a security action to protect a computing device from a potential security threat indicated by the network anomaly, and (4) at least one physical processor configured to execute the identification module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an initial set of recorded packet performance data that describes an instance of an attempt to establish a network connection path between an original node and a subsequent node in a network, (2) detect, by a software security system, a network anomaly based on comparison data resulting from a comparison between the initial set of recorded packet performance data and an additional set of recorded packet performance data that describes another instance of an attempt to establish a network connection path between the original node and the subsequent node, and (3) perform, by the software security system, and in response to detecting the network anomaly based on the comparison between the sets of packet performance data, a security action to protect the computing device from a potential security threat indicated by the network anomaly.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
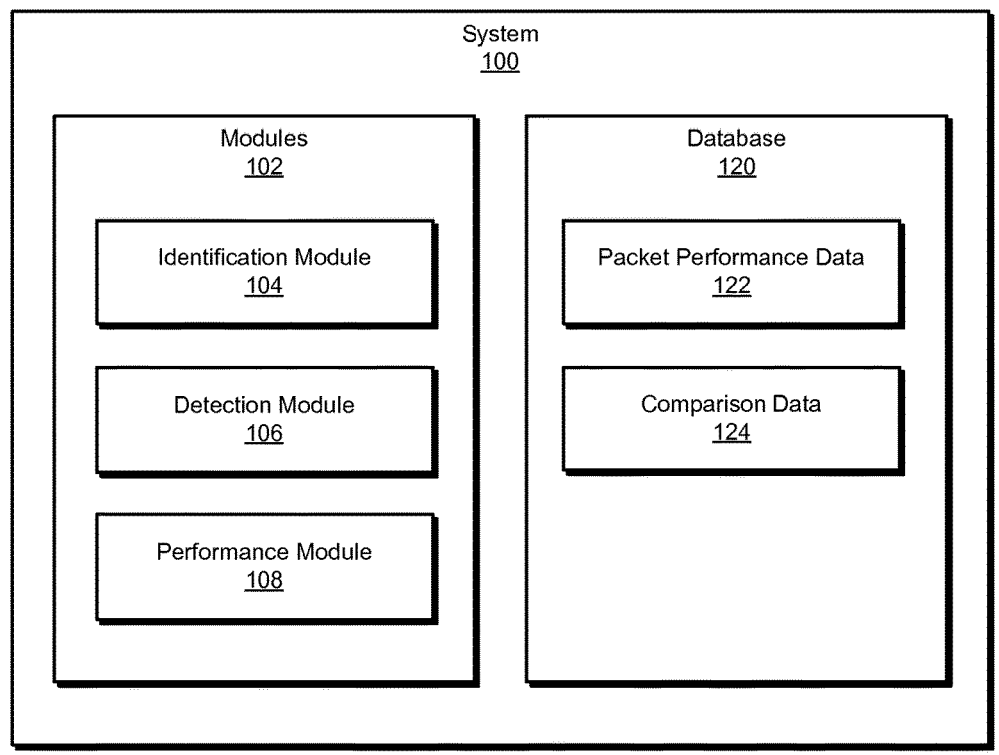
FIG. 1 is a block diagram of an exemplary system for evaluating networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating networks. As will be explained in greater detail below, the disclosed systems and methods may improve on techniques for identifying "man in the middle" and related attacks by, for example, comparing specific sets of packet performance data to identify network anomalies. Moreover, the disclosed systems and methods may operate in a manner that is automated, autonomous, batch-mode, and/or transparent to a user, thereby increasing a frequency, efficiency, accuracy, and/or level of protection for users. Similarly, the disclosed systems and methods may aggregate, centralize, share, and/or data mine the results of checks for network attacks, thereby improving the ability to protect users (e.g., to automatically protect one user device based at least in part on information obtained from another user device).

Figure 2:
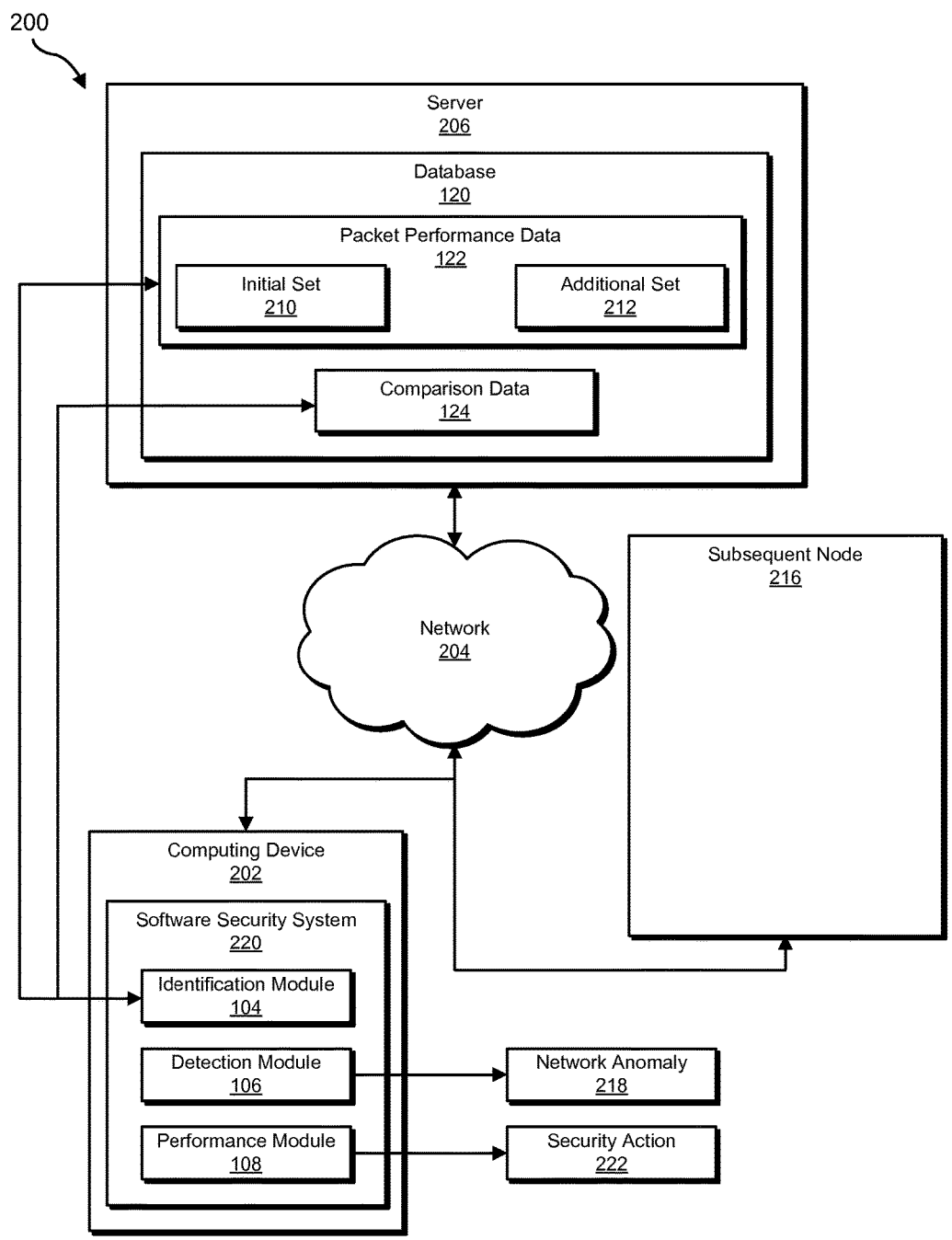
FIG. 2 is a block diagram of an additional exemplary system for evaluating networks.

The following will provide, with reference to FIGS. 1-2, detailed descriptions of exemplary systems for evaluating networks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for evaluating networks. As illustrated in this figure, exemplary system 100 may include one or more modules 102 for performing one or more tasks. For example, and as will be explained in greater detail below, exemplary system 100 may also include an identification module 104 that may identify an initial set of recorded packet performance data that describes an instance of an attempt to establish a network connection path between an original node and a subsequent node in a network. Exemplary system 100 may additionally include a detection module 106 that may detect, as part of a software security system, a network anomaly based on comparison data resulting from a comparison between the initial set of recorded packet performance data and an additional set of recorded packet performance data that describes another instance of an attempt to establish a network connection path between the original node and the subsequent node. Exemplary system 100 may also include a performance module 108 that may perform, as part of the software security system, and in response to detecting the network anomaly based on the comparison between the sets of packet performance data, a security action to protect the computing device from a potential security threat indicated by the network anomaly. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store packet performance data 122, which may indicate the results of a check, or test, of the quality, strength, and/or speed, of a network connection between two nodes, as discussed further below. Packet performance data 122 may include historical data from one or more endpoint computing devices. Database 120 may also be configured to store comparison data 124, which may indicate the results of the comparison between two or more sets of packet performance data, as is also discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to evaluate networks. As will be described in greater detail below, identification module 104 may identify an initial set 210 of recorded packet performance data that describes an instance of an attempt to establish a network connection path between an original node (e.g., computing device 202) and a subsequent node 216 (e.g., an intermediary node or a destination node, such as a web address) in network 204. Detection module 106 may detect, as part of a software security system 220, a network anomaly 218 based on comparison data resulting from a comparison between initial set 210 of recorded packet performance data and an additional set 212 of recorded packet performance data that describes another instance of an attempt to establish a network connection path between the original node and subsequent node 216. Moreover, performance module 108 may perform, as part of software security system 220, and in response to detecting network anomaly 218 based on the comparison between the sets of packet performance data, a security action 222 to protect computing device 202 (or another computing device) from a potential security threat indicated by network anomaly 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing, managing, and/or comparing sets of packet performance data, as discussed above. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

In the example of FIG. 2, both packet performance data 122 and comparison data 124 may be stored server-side within server 206. Nevertheless, in other examples, one or more of these items of data may be stored server-side, client-side (e.g., within computing device 202), and/or mixed between server 206 and computing device 202. Similarly, server 206 and/or computing device 202 (or another device, such as a proxy device) may perform the comparison between sets of packet performance data, as discussed further below.

In one specific embodiment, upon connecting to a network, computing device 202 may retrieve one or more items of comparison data 124 from server 206. The items of comparison data 124 may indicate whether the network is known to be safe, known to be malicious, and/or unknown (or otherwise indicate a degree, or safety score, indicative of the known level of safety). Importantly, comparison data 124 may be based, at least in part, on a comparison between two or more sets of packet performance data that share at least one source node. Computing device 202 may then alert a user or application about the comparison data 124 and the associated indication of the level of safety associated with the network, thereby enabling the user or application to make better informed decisions about whether to connect to the network or otherwise take remedial action. Additionally, or alternatively, computing device 202 may monitor for network anomalies by comparing sets of packet performance data (each of which may be newly recorded client-side by computing device 202 and/or stored server-side by server 206 from a previous connection attempt by the same or different computing device). Upon detecting a network anomaly, computing device 202 may report the detection and/or information that generated the detection to server 206, thereby enabling server 206 to aggregate, centralize, share, and/or data mine the reported information in combination with information reported from other client computing devices, as discussed further below.

Figure 3:
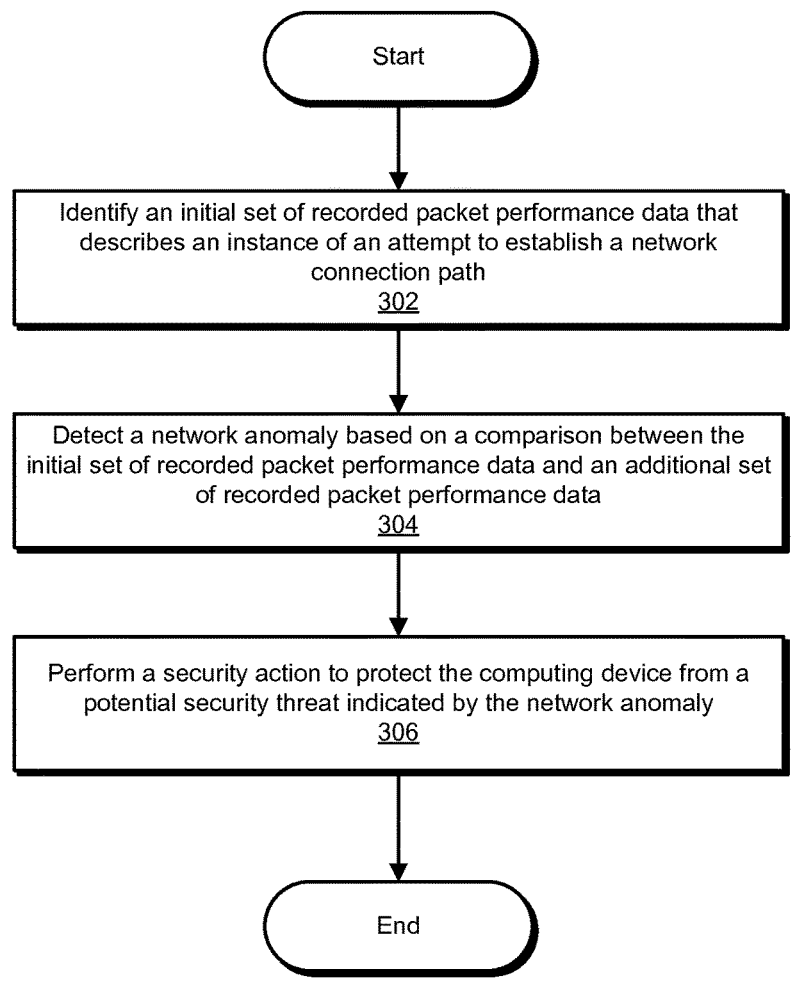
FIG. 3 is a flow diagram of an exemplary method for evaluating networks.

FIG. 3 is a flow diagram of an exemplary computer-implemented method 300 for evaluating networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an initial set of recorded packet performance data that describes an instance of an attempt to establish a network connection path between an original node and a subsequent node in a network. For example, identification module 104 may, as part of computing device 202 in FIG. 2, identify initial set 210 of recorded packet performance data that describes an instance of an attempt to establish a network connection path between an original node 214 and subsequent node 216 in network 204.

As used herein, the term "packet performance data" generally refers to data describing the quality of an attempted network connection in transferring network packets. Specifically, the quality of an attempted network connection may be defined in terms of speed (or acceleration), distance, bandwidth, reliability, availability, stability, a number of hops, and/or any other suitable network connection quality factor. In a typical example, packet performance data may refer to a number of nodes, a direction of the network connection path, packet travel time, and/or the identity of the nodes within the network connection path.

As used herein, the term "original node" generally refers to a client-side, user-based, and/or other requesting node that initiates a network connection, as discussed further below. Moreover, as used herein, the term "subsequent node" generally refers to any intermediary or terminal node within the network connection path (e.g., a destination web server and/or any router, switch, and/or other intermediary device between the original node and the destination web server). Similarly, as used herein, the term "network connection path" generally refers to a sequence of nodes that a network packet traverses during network communications (with the caveat that the disclosed systems and methods may identify information, such as reputation information, about network connection paths, and the earlier original node and nearby nodes within each network connection path, without necessarily possessing information about every single node along the respective network connection path). Furthermore, as used herein, the term "set of packet performance data" generally refers to an aggregated collection of at least two items of data (e.g., two fields of data) that describe the packet performance of the attempt to establish the network connection path, as discussed further below.

Identification module 104 may identify the initial set of packet performance data in a variety of ways. For example, identification module 104 may, as part of computing device 202, record the packet performance data itself based on the execution of a network analysis command or application. Additionally, or alternatively, identification module 104 may receive the initial set of packet performance data from a backend server of a security vendor, such as server 206.

In some examples, the initial set of recorded packet performance data may include output from a network analysis command. The output may further include a sequence of network address identities and/or packet travel time for each network address identity in the sequence of network address identities. As used herein, the term "network address" may include a web or Internet address, which may refer to a domain name, a hostname, a UNIFORM RESOURCE LOCATOR, an alphanumeric network device name, a network address, and/or an INTERNET PROTOCOL address. Similarly, the packet travel time may refer to a round-trip time (direct or indirect) between two nodes and/or a one-way-trip time (direct or indirect) from one node to another node. For example, the packet travel time may refer to a round-trip time from the original node to the subsequent node. Additionally, or alternatively, the packet travel time may refer to a one-way-trip time from one node to an adjacent, or next, node within the network connection path. In one specific example, the network analysis command constitutes a traceroute command (e.g., "traceroute" on APPLE MAC OS, "traceroute(8)" on UNIX, "tracert" on MICROSOFT WINDOWS, "PathPing" on MICROSOFT WINDOWS NT-based systems, and/or "traceroute6" or "tracert6" for IPv6-based network connections). This command may include options that enable a user or application to specify a number of packets sent to each node, a timeout value for marking a packet as failed, and/or a maximum number of nodes. As another example, the network analysis command may correspond to the PING command.

The subsequent node may refer to either a destination node or an intermediary node between the original node and the destination node. In a more specific example, the subsequent node may include either: (1) a destination web server requested by an application at the computing device or (2) an intermediary node on the network connection path between the original node and the destination web server.

The destination node may be selected by a user during ordinary web browsing (or other application use). Additionally, or alternatively, software security system 220 may select the destination node as a node not controlled by the corresponding security vendor (e.g., a SYMANTEC security agent may select the GOOGLE homepage as a destination node). Software security system 220 and/or the security vendor may select one or more of these destination nodes based on an estimated degree to which the network connection path to the nodes is expected to be safe and trusted (e.g., top 50 traffic websites like FACEBOOK and GOOGLE), unsafe and malicious, and/or malicious. Software security system 220 may then compare the results of a packet performance analysis, as discussed below, with the measured set of expectations.

As another example, additionally or alternatively, software security system 220 may select a backend server of the security vendor as the destination node. In a specific example, the network connection path may be formed in either or both of two directions: (1) from the end-user computing device 202 to the backend server and/or (2) from the backend server to the end-user computing device 202. Accordingly, the network analysis may be bidirectional.

In other words, the attempt to establish the network connection path may correspond to an attempt to connect to a backend server provided by a security vendor that collects packet performance data from a multitude of client devices and stores the packet performance data within a security database to identify reputations of network devices. Additionally, or alternatively, the attempt to establish the network connection path may correspond to an attempt to connect to the computing device (e.g., computing device 202) by a backend server (e.g., server 206) provided by a security vendor that collects packet performance data from a multitude of client devices and stores the packet performance data within a security database (e.g., database 120) to identify reputations of network devices (e.g., the first, second, third, and/or N subsequent network devices, whether physical or virtual, to which the computing device connects on the path toward the destination node).

Figure 4:
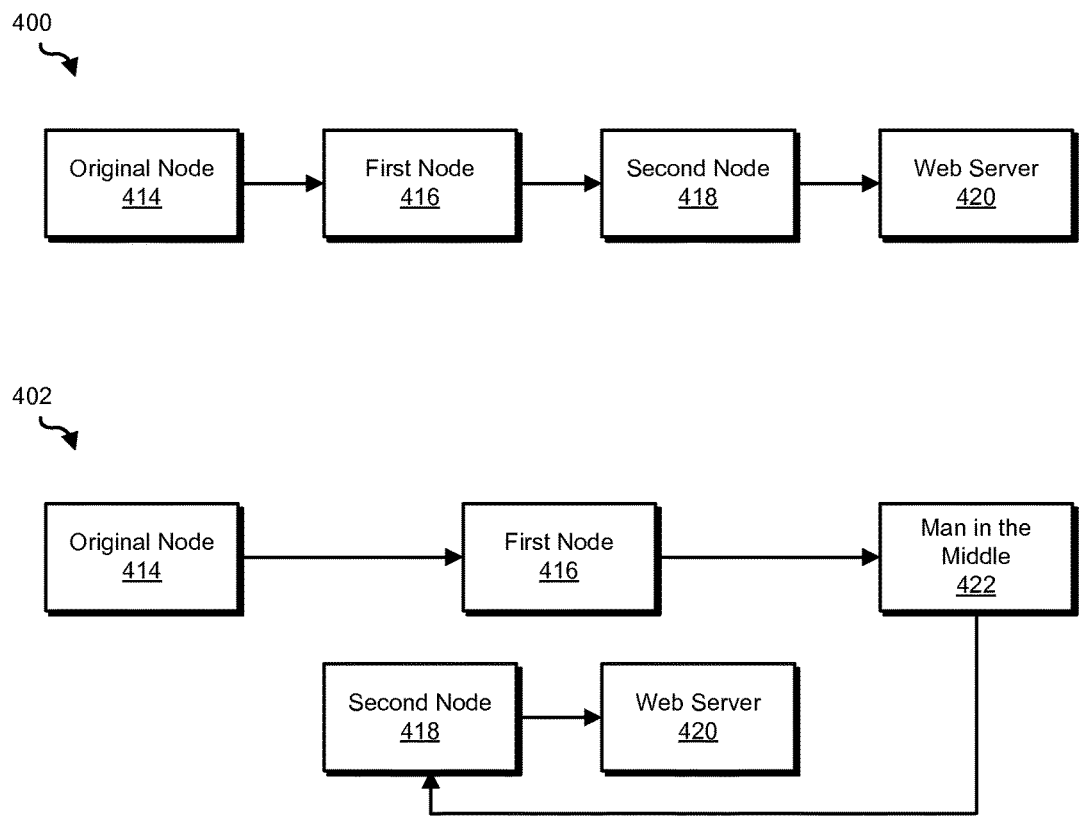
FIG. 4 is a block diagram of exemplary network connection paths.

FIG. 4 illustrates an exemplary network connection path 400 that includes an original node 414, a first node 416, a second node 418, and a web server 420 (which may correspond to a terminal or destination node). The initial set of packet performance data may describe network connection path 400 formed (e.g., as shown by arrows within FIG. 4) between these four nodes. The example of FIG. 4 is simplified for illustration purposes. In practice, typical network connection paths between endpoint computing devices and destination web addresses, such as the GOOGLE homepage, can involve 20 or more network hops.

Figure 5:
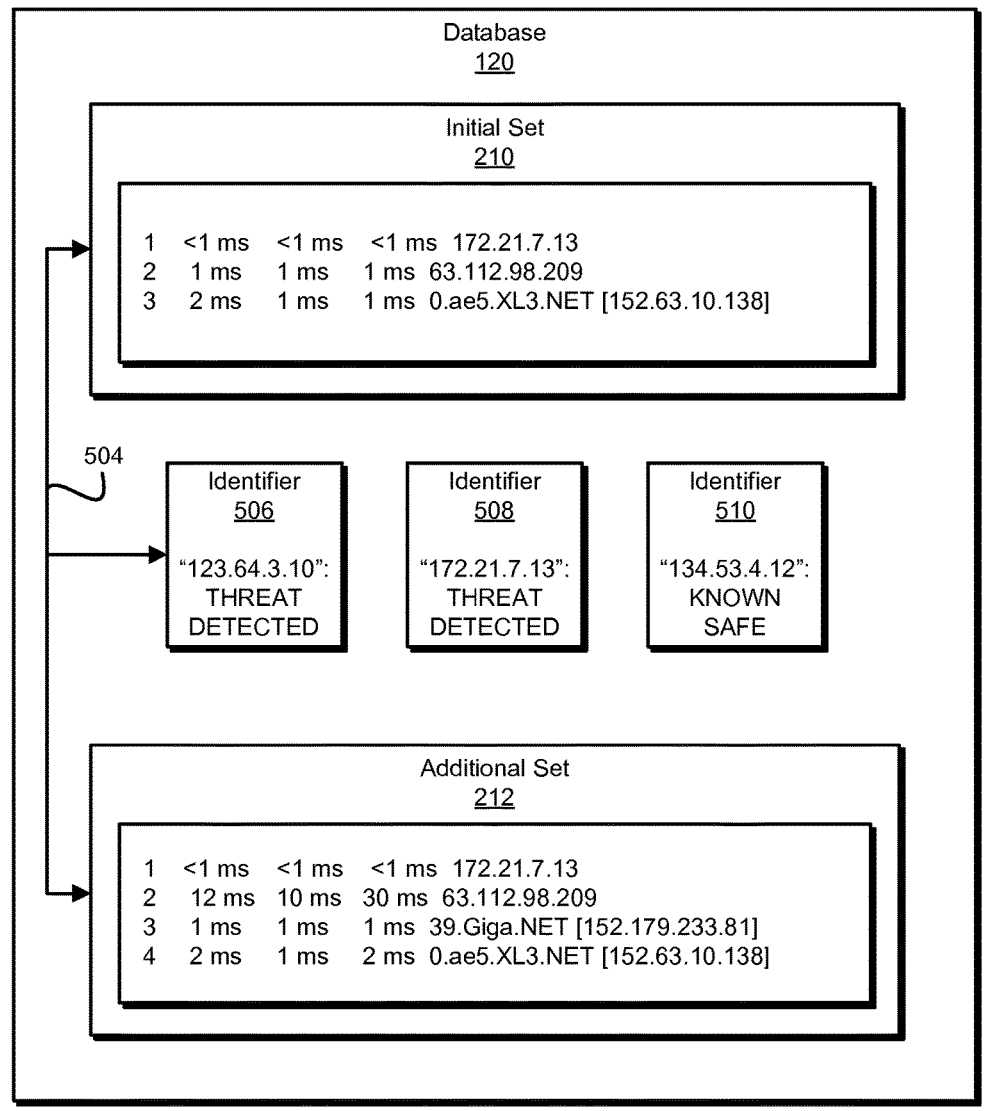
FIG. 5 is a block diagram of an exemplary database that stores information for evaluating networks.

Similarly, FIG. 5 discloses a block diagram of database 120, which may include further details of initial set 210. As further shown in FIG. 5, initial set 210 illustrates network packet performance data that indicates return travel times (e.g., the time that it takes a network packet to travel from the original node to another node on network connection path 400 and then return to the original node). The three lines of packet performance data within initial set 210 (i.e., the lines numbered 1, 2, and 3 in FIG. 5) correspond to the return travel times from the original node to first node 416, second node 418, and web server 420, respectively, and as further shown in FIG. 4 (discussed above). Each line of packet performance data within initial set 210 further includes three different instances of return travel times, which each correspond to a different packet sent to the same node along network connection path 400. In other words, a network analysis command, such as traceroute, may issue three separate packets (or any arbitrary number of packets) to each node along the network connection path.

After identifying the initial set of packet performance data, identification module 104 may additionally provide the initial set of recorded packet performance data to a security database (e.g., database 120) of a backend server (e.g., server 206) provided by a security vendor that collects packet performance data from a multitude of client devices and stores the packet performance data within the security database to identify reputations of network devices. For example, identification module 104 may provide the initial set of packet performance data to server 206 in response to detection module 106 detecting a network anomaly, as discussed further below. Moreover, in providing the initial set of packet performance data to server 206, identification module 104 may also provide an identifier for the initial set of recorded packet performance data to the backend server to enable the security database to store the initial set of recorded packet performance data indexed by the identifier.

Returning to FIG. 5, identification module 104 and/or server 206 may associate initial set 210 of packet performance data and/or a result of comparing initial set 210 with another set of packet performance data (as discussed further below) with an identifier 506. As shown in FIG. 5, identifier 506 may include the INTERNET PROTOCOL address corresponding to the second node (i.e., second node 418 in FIG. 4) to which the computing device connects. Additionally, or alternatively, identifier 506 may include any single item, or combination of items, that identify (or are associated with) one or more nodes along network connection path 400. In exemplary embodiments, nodes closer to the original node may be more important, or valuable, for detecting potential security threats. In other words, the disclosed systems and techniques may focus on identifying problematic originating network nodes (e.g., the first, second, third, and nearby subsequent nodes to which the computing device first connects) rather than destination or terminal nodes, which may be analyzed, whitelisted, and/or blacklisted using other techniques.

As further shown in FIG. 5, database 120 may also include an identifier 508 and an identifier 510. Identifier 508 specifies the INTERNET PROTOCOL address "172.21.7.13" which corresponds to first node 416 in FIG. 4. In contrast, identifier 510 indicates a different INTERNET PROTOCOL address that does not correspond to initial set 210 or additional set 212. Accordingly, identifier 510 provides an example of how database 120 may include packet performance data, and associated identifiers, originally captured by a wide variety of endpoint computing devices and corresponding to a wide variety of instances of attempts to establish various network connection paths (the process of data mining a large data set of packet performance data is discussed further below).

In view of the above, the identifier may include any permutation of the following: (1) an identifier of an originating node (e.g., a network name, a SERVICE SET IDENTIFIER, a host name, a GLOBALLY UNIQUE IDENTIFIER, a crypto-processor identifier, a MAC address, an INTERNET PROTOCOL address, and/or any other identifier that identifies a network or identifies a corresponding device, such as a gateway, that provides access to the network), (2) an identifier of a location associated with the originating node or a location in which the originating node is located (e.g., address field(s), store number, geolocation, and/or latitude and longitude coordinates), (3) an identifier of a vendor that provides a local network to which the computing device first connects (e.g., the vendor of a retail establishment in which the computing device attempts to connect to a network and/or another vendor that the vendor of the retail establishment contracts to provide network access for its patrons), and/or (4) a website or portal through which a user or application of the computing device accesses the network. Moreover, the identifier may include a multitude of these items of data for a multitude of nodes along the network connection path. Accordingly, the disclosed systems and methods may assign reputations to a single device and its associated network or, additionally or alternatively, assign a reputation to a combination of devices and their associated network(s).

The identifier for the initial set of recorded packet performance data may be included within the set of recorded packet performance data. For example, the identifier may simply correspond to the INTERNET PROTOCOL address of the first node to which the computing device connects (e.g., first node 416). Accordingly, server 206 may extract the identifier without computing device 202 separately specifying the identifier. Additionally, or alternatively, identification module 104 may provide the identifier for the initial set of recorded packet performance data to the backend server separate from the packet performance data (e.g., in a separate field of data that is attached to the set of packet performance data, inserted adjacent to the initial set of packet performance data, and/or coupled with the initial set of packet performance data). Moreover, unless otherwise specified, the techniques for identifying and sharing packet performance data described herein can equally apply to an additional set of packet performance data (e.g., additional set 212) in a parallel manner.

Identification module 104 may identify the initial set of packet performance data automatically, autonomously, and/or in a manner that is transparent or semi-transparent (e.g., through a background application) to the user of computing device 202. Similarly, identification module 104 may identify the initial set of packet performance data (e.g., execute the network analysis command and extract the packet performance data from the output of the network analysis command) according to a predefined schedule, at a fixed interval, upon a user request, upon the request of an application, and/or upon the request of a security server (e.g., server 206) of a software security vendor.

Moreover, identification module 104 may identify the initial set of packet performance data by executing the network analysis command or application using one or more predefined destination nodes (e.g., according to a predefined order or based on a list of destination nodes), as discussed above, which may be specified, in whole or in part, by the security vendor and/or its security systems. Additionally, or alternatively, identification module 104 may identify the initial set of packet performance data based on user activity (e.g., such that the destination node corresponds to a web server address requested by a user or application during ordinary web browsing activity). For example, identification module 104 may sample destination addresses from user or application activity according to a predefined schedule, at a fixed interval, randomly, or according to any other programmed timing. Additionally, identification module 104 may identify the initial set of packet performance data by receiving the initial set from server 206 based on a result of server 206 executing the network analysis command or application (i.e., in an opposite direction from the server to the client), which may be performed according to any of the timings discussed above.

At step 304, one or more of the systems described herein may detect, as part of a software security system, a network anomaly based on comparison data resulting from a comparison between the initial set of recorded packet performance data and an additional set of recorded packet performance data that describes another instance of an attempt to establish a network connection path between the original node and the subsequent node. For example, detection module 106 may, as part of computing device 202 in FIG. 2, detect, as part of software security system 220, network anomaly 218 based on comparison data resulting from a comparison between initial set 210 of recorded packet performance data and additional set 212 of recorded packet performance data that describes another instance of an attempt to establish the network connection path between original node 214 and subsequent node 216.

Detection module 106 may detect the network anomaly in a variety of ways. For example, detection module 106 may detect the network anomaly by comparing two sets of packet performance data. Either or both sets of packet performance data may be originally captured (in whole or in part) by detection module 106 at computing device 202 or, instead, retrieved from database 120 from server 206. Moreover, when retrieving packet performance data from server 206, the packet performance data may have been originally uploaded to server 206 by computing device 202 or, instead, by another computing device in the field. In other words, a security vendor may provide a software security product that includes a feature for uploading, aggregating, centralizing, sharing, and/or data mining packet performance data (and the results of any other checks for network intrusions and other attacks). This enables the backend server to collect the packet performance data from multiple endpoint computing devices and index it by one or more network or device identifiers, as discussed above.

In a more specific example, detection module 106 may detect the network anomaly based on the comparison data by receiving historical data from a security database (e.g., database 120) of a backend server (e.g., server 206) provided by a security vendor that collects packet performance data from a multitude of client devices and stores the packet performance data within the security database to identify reputations of network devices. The historical data may include either or both of (1) the additional set of recorded packet performance data that describes the other instance of the attempt to establish the network connection path and/or (2) the comparison data resulting from the comparison between the initial set of recorded packet performance data and the additional set of recorded packet performance data.

As discussed above, either or both sets of packet performance data may have been originally captured by computing device 202 or another endpoint computing device in the field (e.g., computing device 202 may benefit from multiple different sets of packet performance data captured by another endpoint computing device using the same or similar software security product that enables sharing of packet performance data and/or the results of packet performance data comparisons). Moreover, as also discussed above, the generation of the comparison data and/or the comparison between sets of packet performance data may be performed either client-side at computing device 202 and/or server side at server 206.

Additionally, or alternatively, the computing device may originally capture both sets of packet performance data.

Specifically, computing device 202 may identify both (1) the initial set of recorded packet performance data that describes an instance of an attempt, by the computing device, to establish a network connection path between the original node and the subsequent node in the network and (2) the additional set of recorded packet performance data that describes the other instance of an attempt, by the computing device, to establish a network connection path between the original node and the subsequent node in the network. Computing device 202 may store the sets of data within a cache or local datastore at computing device 202. Detection module 106, which may be located either at computing device 202 or server 206, may detect the network anomaly by comparing the two sets of data that were both originally captured at the same computing device. In some examples, detection module 106 may be located at computing device 202, and identification module 104 may only report one or more items of packet performance data and/or comparison data to server 206 upon the detection of a network anomaly. In further examples, identification module 104 may collect aggregated packet performance data over a period of time prior to uploading the collected packet performance data to server 206 in a bulk or batch process.

In one embodiment, detection module 106 may detect a network anomaly that includes one or more of: (1) a security layer certificate (e.g., a TRANSPORT LAYER SECURITY certificate and/or a SECURE SOCKETS LAYER certificate) and/or an identifier of the certificate, (2) an identity of a network node in the network connection path, (3) a number of hops in the network connection path, (4) a connection speed in attempting to establish the network connection path, (5) a direction of the network connection path, and/or (6) header metadata within layers 3-5 of a network packet according to the open systems interconnection model (e.g., a TRANSMISSION CONTROL PROTOCOL header value, a checksum value, and/or an acknowledgment number). Notably, in the case of a network analysis command or application, such as traceroute (as discussed above), both the initial set of packet performance data and the additional set of packet performance data may be based on the output of the same or compatible network analysis command(s) or application(s).

Returning to the example of FIG. 4, a network connection path 402 shows the additional instance of the attempt to establish the network connection path first described above regarding network connection path 400. For example, web server 420 may answer requests for the GOOGLE homepage. Network connection path 400 and network connection path 402 may correspond to two different instances of attempts to establish network connection paths with web server 420 and thereby access the GOOGLE homepage.

As further shown in FIG. 4, network connection path 402 includes an additional node in the middle of the path. Specifically, a "man in the middle" 422 has been inserted between first node 416 and second node 418 within network connection path 402. Similarly, and returning to FIG. 5, additional set 212, which corresponds to network connection path 402, shows an additional hop within network connection path 402 as compared to network connection path 400. Specifically, additional set 212 includes an additional line of packet performance data, which is numbered 3 within additional set 212 (the insertion of line 3 within additional set 212 has pushed the line corresponding to web server 420 from line 3 in initial set 210 to line 4 in additional set 212). The insertion of "man in the middle" 422 may constitute the detected network anomaly. Similarly, additional set 212 also indicates another network anomaly because the return travel times for INTERNET PROTOCOL address "63.112.98.209" have increased significantly from initial set 210 (in which case the times were all one ms) to additional set 212 (in which case the times were 12 ms, 10 ms, and 30 ms, respectively).

The example of FIGS. 4 and 5 is merely exemplary. Detection module 106 may detect the network anomaly based on any single factor, or permutation of factors, as discussed above, and not just based on the insertion of a network node (e.g., "man in the middle" 422) within the network connection path and/or based on a significant delay in connecting to a network node (e.g., the delay associated with INTERNET PROTOCOL address "63.112.98.209"). In some examples, detection module 106 may perform data mining on one or more sets of packet performance data to detect one or more network anomalies. For example, detection module may perform data mining on 100, 1000, 1 million, 1 billion, and/or 1 trillion sets of packet performance data, each of which may be collected from 100, 1000, 1 million, and/or 1 billion different users or endpoint computing devices (which may all be using the same or compatible software security product(s) for sharing packet performance data, as discussed above). These numbers are arbitrary and merely exemplary. Detection module 106 may use a scalable machine learning algorithm (e.g., APACHE MAHOUT) on the one or more sets of packet performance data (and, optionally, the identifiers associated with the sets of packet performance data) to detect one or more network anomalies. Moreover, database 120 may correspond to a graph database that uses graph structures for semantic queries with nodes, edges, and properties to represent and store data. In other words, the graph database may refer to any storage system that provides index-free adjacency, which may refer to configurations in which every element contains a direct pointer to its adjacent elements and no index lookups are necessary. Detection module 106 may apply a machine learning algorithm to data stored within the graph database, as discussed above. Detection module 106 may also share the results of the data mining with one or more endpoint computing devices.

In one specific example, detection module 106 may calculate a statistical measure of differences between the initial set of recorded packet performance data and the additional set of recorded packet performance data. For example, detection module 106 may measure time, speed, distance, bandwidth, hop count, and/or any other packet performance value for one or more nodes within one or more sets of packet performance data. Similarly, detection module 106 may measure differences between any of these items (e.g., time, speed, distance, etc.), such as the difference in return travel time for INTERNET PROTOCOL address "63.112.98.209" and the difference in hop count shown in FIG. 5. Detection module 106 may similarly calculate a statistical measure, such as a mean, median, mode, range, standard deviation, and/or any other statistical measure for any permutation of the above measurements.

Detection module 106 may compare the statistical measure of differences to a security threshold to determine that the statistical measure of differences exceeds the security threshold. In the example of FIG. 5, detection module 106 may compare an average of the three return travel times listed for INTERNET PROTOCOL address "63.112.98.209" within additional set 212 with a predefined security threshold, such as nine ms. Detection module 106 may then determine that the average of the three return travel times exceeds that threshold, thereby indicating a network anomaly. In a more specific example, the security threshold may be based, at least in part, on a baseline statistical measure of differences between instances of attempting to establish the network connection path (e.g., the systems and methods herein may monitor packet performance data to determine a baseline level of normal variation with which to compare newly obtained packet performance data to detect network anomalies that significantly deviate from the baseline level).

Notably, the disclosed systems and methods may share packet performance data, comparison data, and/or the identification of a network anomaly generated by one endpoint computing device with another endpoint computing device. Similarly, the disclosed systems and methods may compare packet performance data originally captured by one endpoint competing device with packet performance data originally captured by another endpoint computing device. In these exemplary ways, the disclosed systems and methods may improve upon isolated systems that attempt to detect potential security threats in a vacuum.

At step 306, one or more of the systems described herein may perform, by the software security system, and in response to detecting the network anomaly based on the comparison between the sets of packet performance data, a security action to protect the computing device from a potential security threat indicated by the network anomaly. For example, performance module 108 may, as part of computing device 202 in FIG. 2, perform, by software security system 220, and in response to detecting network anomaly 218 based on the comparison between the sets of packet performance data, security action 222 to protect computing device 202 from a potential security threat indicated by network anomaly 218.

Performance module 108 may perform the security action in a variety of ways. In general, performance module 108 may take some action to inhibit the network connection, such as prompting the user for authorization, alerting a user to the potential security threat, reporting a reputation of the network or device to which the user or application is attempting to connect, requesting that an administrator override a block of the network connection, reducing network speed or bandwidth for the network connection, increasing a level of encryption or other security protection, placing an application and/or associated data that attempted to establish the network connection path within a sandbox or quarantined area, blocking the network connection, and/or increasing a count of detected potential security threats that is measured against an allowed quota of detected potential security threats.

As explained above in connection with method 300 in FIG. 3, the disclosed systems and methods may improve on techniques for identifying "man in the middle" and related attacks by, for example, comparing specific sets of packet performance data to identify network anomalies. Moreover, the disclosed systems and methods may operate in a manner that is automated, autonomous, batch-mode, and/or transparent to a user, thereby increasing a frequency, efficiency, accuracy, and/or level of protection for users. Similarly, the disclosed systems and methods may aggregate, centralize, share, and/or data mine the results of checks for network attacks, thereby improving the ability to protect users (e.g., to automatically protect one user device based at least in part on information obtained from another user device).

Figure 6:
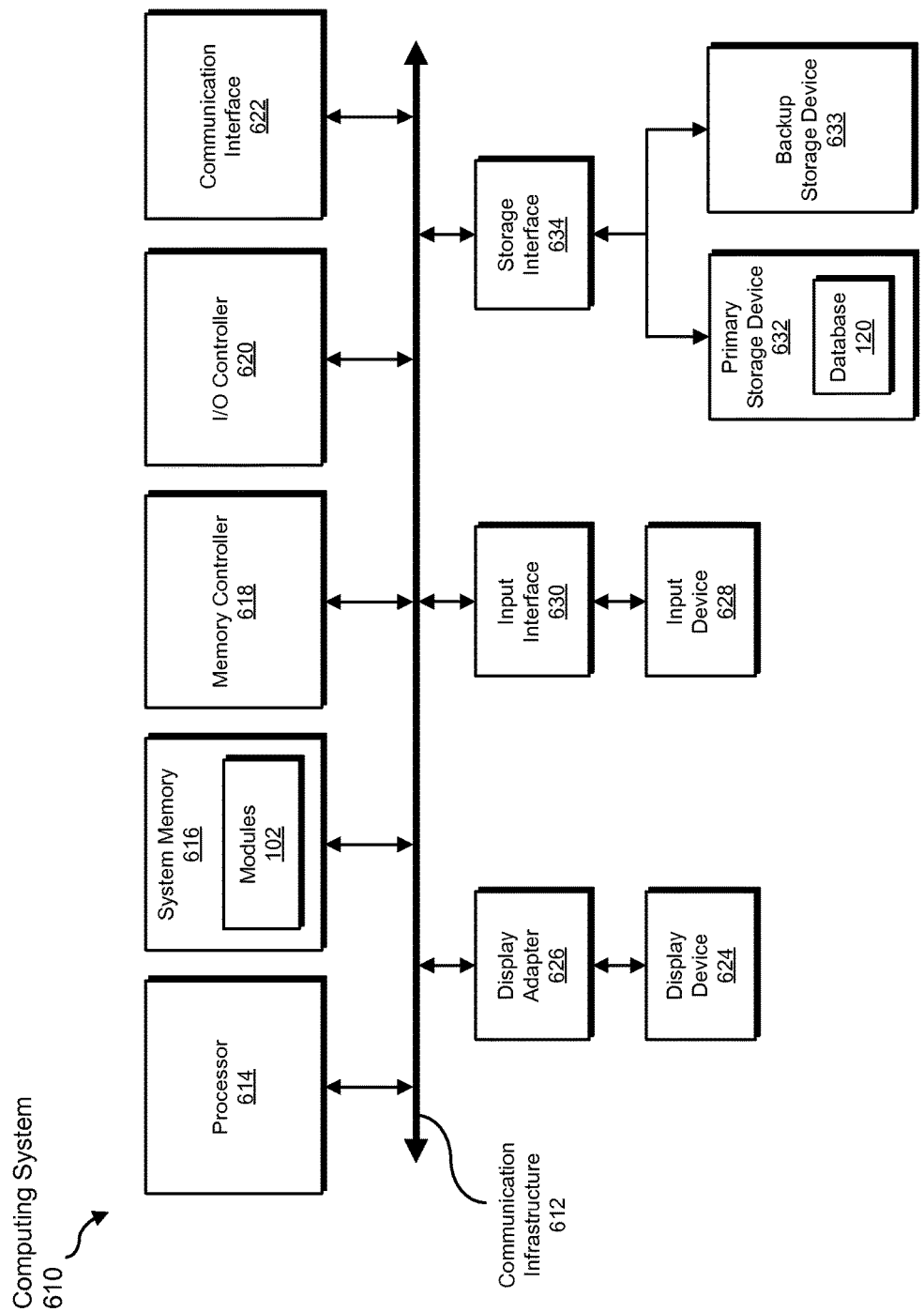
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like.

Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
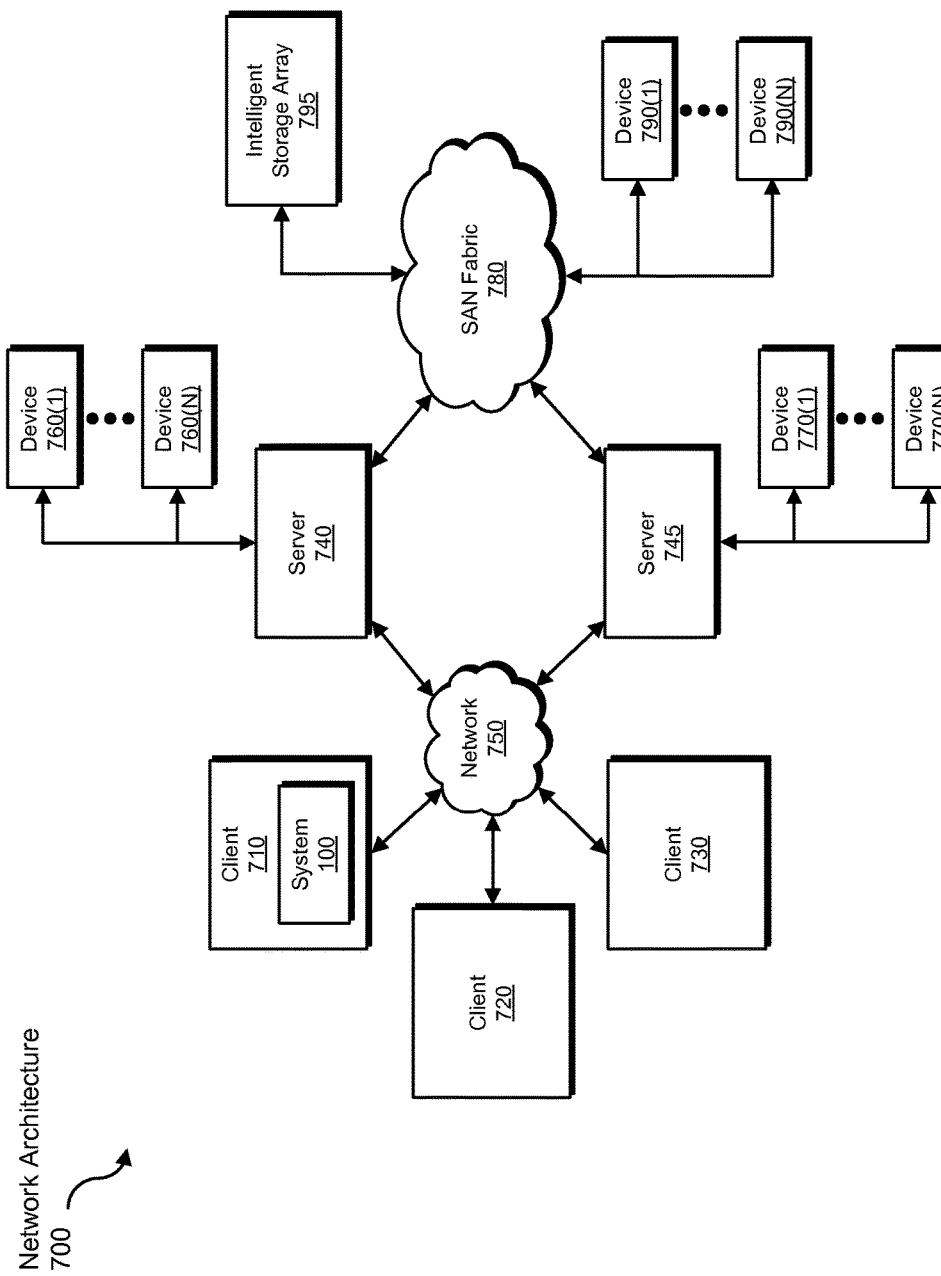
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for evaluating networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a network packet, packet performance data, comparison data, and/or a security policy to be transformed, transform one or more of these items of data, output a result of the transformation to a display, output device, and/or storage, use the result of the transformation to evaluate networks, detect network attacks and intrusions, and/or protect users, and store the result of the transformation to a database or other storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating networks, at least a portion of the method being performed by a computing device comprising at least one processor, the method comprising:

identifying an initial set of recorded packet performance data that describes an instance of an attempt to establish a network connection path both from an original node to a subsequent node in a network and from the subsequent node to the original node;

detecting, by a software security system, a network anomaly based on comparison data resulting from a comparison between the initial set of recorded packet performance data and an additional set of recorded packet performance data that describes another instance of the attempt to establish the network connection path both from the original node to the subsequent node and from the subsequent node to the original node such that a network analysis corresponding to the comparison is bidirectional, the comparison data comprising a safety score indicative of a known level of safety and the detecting comprising:

calculating a statistical measure of differences between the initial set of recorded packet performance data and the additional set of recorded packet performance data; and comparing the statistical measure of differences to a security threshold to determine that the statistical measure of differences exceeds the security threshold; and performing, by the software security system, and in response to detecting the network anomaly based on the comparison between the sets of packet performance data, a security action to protect the computing device from a potential security threat indicated by the network anomaly, the security action comprising transmitting the comparison data to the computing device from a backend server provided by a security vendor that collects packet performance data from a multitude of client devices and stores the packet performance data within a security database to identify reputations of network devices.

2. The method of claim 1, further comprising providing the initial set of recorded packet performance data that describes the instance of the attempt to establish the network connection path to the security database of the backend server provided by the security vendor that collects packet performance data from the multitude of client devices and stores the packet performance data within the security database to identify reputations of network devices.

3. The method of claim 2, further comprising providing an identifier for the initial set of recorded packet performance data to the backend server to enable the security database to store the initial set of recorded packet performance data indexed by the identifier.

4. The method of claim 3, wherein the identifier for the initial set of recorded packet performance data is provided to the backend server separate from the packet performance data.

5. The method of claim 1, wherein the backend server generates the comparison data by comparing the initial set of recorded packet performance data and the additional set of recorded packet performance data.

6. The method of claim 1, wherein the instance of the attempt to establish the network connection path corresponds to an attempt to connect to the backend server provided by the security vendor that collects packet performance data from the multitude of client devices and stores the packet performance data within the security database to identify reputations of network devices.

7. The method of claim 1, wherein the instance of the attempt to establish the network connection path corresponds to an attempt to connect to the computing device by the backend server provided by the security vendor that collects packet performance data from the multitude of client devices and stores the packet performance data within the security database to identify reputations of network devices.

8. The method of claim 1, wherein the subsequent node comprises either:
a destination web server requested by an application at the computing device; or
an intermediary node on the network connection path between the original node and the destination web server.

9. The method of claim 1, wherein the network anomaly comprises a change in at least one of:
a connection speed in attempting to establish the network connection path;
a direction of the network connection path; and
header metadata within layers 3-5 of a network packet according to the open systems interconnection model.

10. The method of claim 1, wherein detecting the network anomaly based on the comparison data comprises receiving historical data from the security database.

11. The method of claim 10, wherein the historical data comprises
the additional set of recorded packet performance data that describes the other instance of the attempt to establish the network connection path.

12. The method of claim 1, wherein the initial set of recorded packet performance data comprises output from a network analysis command, the output comprising a sequence of network address identities.

13. The method of claim 12, wherein the network analysis command comprises a trace route command.

14. The method of claim 12, wherein the comparison between the initial set of recorded packet performance data and the additional set of recorded packet performance data comprises a comparison between initial output from an initial execution of the network analysis command and subsequent output from a subsequent execution of the same or different network analysis command.

15. The method of claim 12, wherein the output further comprises a packet travel time for each network address identity in the sequence of network address identities.

16. The method of claim 1, wherein the security threshold is based, at least in part, on a baseline statistical measure of differences between instances of attempting to establish the network connection path.

17. The method of claim 1, wherein the network anomaly comprises a change in at least one of:
a security layer certificate;
an identity of a network node in the network connection path; and
a number of hops in the network connection path.

18. The method of claim 1, wherein the same computing device records both:
the initial set of recorded packet performance data that describes the instance of the attempt, by the computing device, to establish the network connection path; and
the additional set of recorded packet performance data that describes the other instance of the attempt, by the computing device, to establish the network connection path.

19. A system for evaluating networks, the system comprising:
an identification module, stored in memory, that identifies an initial set of recorded packet performance data that describes an instance of an attempt to establish a network connection path both from an original node to a subsequent node in a network and from the subsequent node to the original node;
a detection module, stored in memory, that detects a network anomaly based on comparison data resulting from a comparison between the initial set of recorded packet performance data and an additional set of recorded packet performance data that describes another instance of the attempt to establish the network connection path both from the original node to the subsequent node and from the subsequent node to the original node such that a network analysis corresponding to the comparison is bidirectional, the comparison data comprising a safety score indicative of a known level of safety and the detecting comprising:

calculating a statistical measure of differences between the initial set of recorded packet performance data and the additional set of recorded packet performance data; and comparing the statistical measure of differences to a security threshold to determine that the statistical measure of differences exceeds the security threshold;

a performance module, stored in memory, that performs, in response to detecting the network anomaly based on the comparison between the sets of packet performance data, a security action to protect a computing device from a potential security threat indicated by the network anomaly, the security action comprising transmitting the comparison data to the computing device from a backend server provided by a security vendor that collects packet performance data from a multitude of client devices and stores the packet performance data within a security database to identify reputations of network devices; and at least one physical processor configured to execute the identification module, the detection module, and the performance module.

20. A non-transitory computer-readable medium comprising one or more computer-readable instructions that, when executed by at least one processor of a computing device, cause the computing device to:

identify an initial set of recorded packet performance data that describes an instance of an attempt to establish a network connection path both from an original node to a subsequent node in a network and from the subsequent node to the original node;

detect, by a software security system, a network anomaly based on comparison data resulting from a comparison between the initial set of recorded packet performance data and an additional set of recorded packet performance data that describes another instance of the attempt to establish the network connection path both from the original node to the subsequent node and from the subsequent node to the original node such that a network analysis corresponding to the comparison is bidirectional, the comparison data comprising a safety score indicative of a known level of safety and the detecting comprising:

calculating a statistical measure of differences between the initial set of recorded packet performance data and the additional set of recorded packet performance data; and comparing the statistical measure of differences to a security threshold to determine that the statistical measure of differences exceeds the security threshold; and perform, by the software security system, and in response to detecting the network anomaly based on the comparison between the sets of packet performance data, a security action to protect the computing device from a potential security threat indicated by the network anomaly, the security action comprising transmitting the comparison data to the computing device from a backend server provided by a security vendor that collects packet performance data from a multitude of client devices and stores the packet performance data within a security database to identify reputations of network devices.

\* \* \* \* \*